United States Patent [19]

Tyler

[11] Patent Number: 5,582,411
[45] Date of Patent: Dec. 10, 1996

[54] SCAVENGING COMPOUND INFILTRATED GASKET

[75] Inventor: Paul S. Tyler, Rochester, Minn.

[73] Assignee: International Business Machines Corporation, Armonk, N.Y.

[21] Appl. No.: 355,068

[22] Filed: Dec. 13, 1994

[51] Int. Cl.⁶ .............................. F16J 15/10; G11B 33/14
[52] U.S. Cl. ........................ 277/23; 277/227; 360/97.02
[58] Field of Search .................. 277/23, 227; 360/97.02, 360/97.03

[56] References Cited

U.S. PATENT DOCUMENTS

| | | | |
|---|---|---|---|
| 4,299,921 | 11/1981 | Youssef | 277/227 |
| 4,581,668 | 4/1986 | Campbell | 360/97 |
| 4,594,626 | 6/1986 | Frangesh | 360/97 |
| 4,633,349 | 12/1986 | Beck et al. | 360/97 |
| 4,684,510 | 8/1987 | Harkins | 423/210 |
| 4,896,231 | 1/1990 | Hoppe | 360/97.02 |
| 5,030,260 | 7/1991 | Beck et al. | 55/316 |
| 5,034,835 | 7/1991 | Yokoyama | 360/97.02 |
| 5,097,366 | 3/1992 | Ueki et al. | 360/97.02 |
| 5,124,856 | 6/1992 | Brown et al. | 360/97.03 |
| 5,150,267 | 9/1992 | Reinisch | 360/97.02 |
| 5,346,518 | 9/1994 | Baseman et al. | 55/267 |

FOREIGN PATENT DOCUMENTS 0050378   2/1990   Japan ................................ 360/97.02

*Primary Examiner*—William A. Cuchlinski, Jr.
*Assistant Examiner*—John L. Beres
*Attorney, Agent, or Firm*—Scott W. Johnston

[57] ABSTRACT

An improved gasket with scavenging capabilities for sealing two relatively stiff mating pieces of an enclosure. The gasket comprises a flexible compressible gasket member shaped to fit between the mating pieces. The gasket member comprises a porous material configured so as to pass only a small amount of ambient atmosphere therethrough. The porous material is infiltrated with a scavenging compound for removing pollutants from the ambient atmosphere passing through the porous material. The gasket has particular application in instrumentality sensitive to pollutants, such as magnetic disc drive devices. Such a disc drive is also disclosed.

12 Claims, 2 Drawing Sheets 5,582,411

SCAVENGING COMPOUND INFILTRATED GASKET

FIELD OF THE INVENTION

The present invention relates generally to a scavenging compound infiltrated gasket. The invention has particular application to data storage systems, and more particularly, to an improved enclosure for preventing pollutants from entering a magnetic disc drive casing. However, the present invention is not limited to such data storage applications.

BACKGROUND OF THE INVENTION

Disk drive components in a magnetic direct access storage device (DASD), principally read/write heads and disk surfaces, are prone to corrosion by gaseous industrial by-products such as sulfur dioxide, hydrogen chloride, hydrogen sulfide, nitrogen oxides, and ammonia. When such pollutants combine with water vapor and dissolve, they form an acid electrolyte. The acid electrolytes may then corrode the metal used in disk drive components by forming corrosive products such as oxides and chlorides which have a larger crystallographic cell structure than the metal itself. The bulges formed of such corrosive products may then crash into the read/write head of the disk drive which is positioned to float a very small distance from the disk surface at a high rate of speed. Such crashes may reduce disk performance and cause possible read/write failures.

One attempt to reduce the effect of corrosive gases on disk components is to coat the metal surfaces with a carbon layer. However, this method has disadvantages because it increases the magnetic spacing between the read/write heads and the disk surface, thereby reducing the strength of the signal sensed by the read/write heads.

Another measure taken to reduce exposure of sensitive disk components to corrosive gases involves sealing the disk drive mechanisms within a housing or enclosure. The enclosure is typically formed of two casing members compressed together with a gasket disposed between their mating surfaces. However, it is almost impossible to create a perfectly sealed disk drive enclosure. Even with the best available match between the mating surfaces and the gaskets, a certain amount of polluted ambient atmosphere may still diffuse or otherwise enter the enclosure through the gaskets, or through leaks between the mating surfaces and the gaskets. The amount of leakage increases as the pressure differential between the inside and outside of the enclosure increases.

To minimize such diffusion, disk drive enclosures are often equipped with a breather filter. The breather filter provides a particularly easy path for air to flow into the enclosure. But to do so, the air must pass through one or more filtering media. The filtering media extract potentially harmful external gases and/or particulate contaminants contained in the air entering the enclosure.

However, a trend has developed in the disk drive manufacturing community to miniaturize the chassis or housing of a disk drive to a size amenable for incorporation into miniature personal computers, such as lap-top or notebook computers, for example. Various industry standards have emerged that specify the external housing dimensions of small and very small form factor data storage systems. One such recognized family of industry standards is the PCMCIA (Personal Computer Memory Card Industry Association) family of standards, which specifies both the dimensions for the data storage system housing and the protocol for communicating control and data signals between the data storage system and a host computer system coupled thereto. Recently, four families or types of PCMCIA device specifications have emerged. For example, a Type-I PCMCIA data storage system must be fully contained within a housing having a maximum height dimension of 3.3 millimeters (mm). A Type-II PCMCIA device housing must not exceed a maximum height of 5.0 mm in accordance with the PCMCIA specification. A maximum height of 10.5 mm is specified for the housing of Type-III PCMCIA devices, and Type-IV devices are characterized as having a maximum housing height dimension in excess of 10.5 mm.

The size constraints specified by the PCMCIA and other industry standards make incorporation of existing filter technology into small and very small form factor drives increasingly difficult. In fact, some PCMCIA Type-III and Type-II devices contain no breather filter at all. For these drives, diffusion of materials into the drives will occur through leaks in the seal with subsequent reaction with the disk surfaces and read/write heads occurring at an uncontrolled rate.

Accordingly, there exists a need in the data storage system manufacturing industry for a very compact enclosure assembly for a disk drive that protects sensitive disk components encased therein from potentially harmful pollutants. The need is particularly strong for a reliable disk drive which is too small to incorporate existing filter technology. There is an additional need to reduce the magnetic spacing between the read/write heads and the disk surface.

SUMMARY OF THE INVENTION

The present invention is an improved gasket with scavenging capabilities for sealing two relatively stiff mating pieces of an enclosure. The gasket comprises a flexible compressible gasket member shaped to fit between the mating pieces. The gasket member comprises a porous material configured so as to pass only a small amount of ambient atmosphere therethrough. The porous material is infiltrated with a scavenging compound for removing pollutants from the ambient atmosphere passing through the porous material.

As previously indicated, the present invention has particular application to magnetic disc drive casings. An advantage of imparting scavenging properties to a disk drive gasket is that small form factor drives that would not otherwise contain a filter due to size constraints will still have a corrosion protection scheme via the gasket. Another important advantage of the present gasket invention pertains to the spacing between the read/write heads and the disk surface. To combat corrosion in some current disk drives, the read/write heads are coated with a protective carbon film. However, this film increases the spacing between the heads and the disk surface and, therefore, for magnetic heads and data storage disks, decreases the strength of the signal sensed by the heads. By removing the carbon coating and incorporating a corrosion protection scheme into the gasket, the magnetic spacing between the read/write heads and disk surfaces can be reduced. Thus, design engineers will be free to concentrate on optimizing performance, rather than compromising performance for corrosion reliability.

DETAILED DESCRIPTION OF THE PREFERRED EMBODIMENTS

Figure 1:
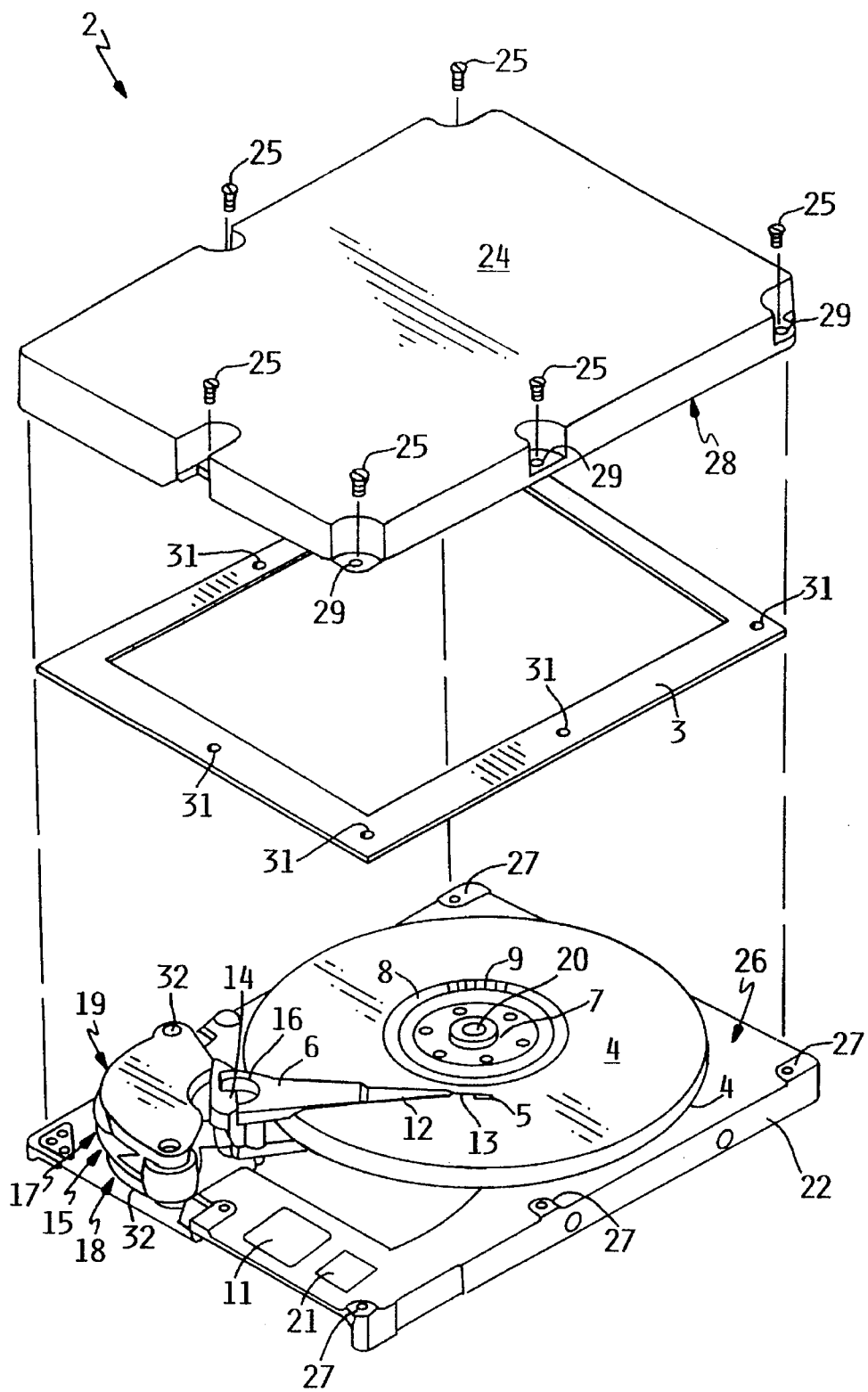
FIG. 1 is a top perspective view of a typical data storage system (with cover removed), including a permeable gasket embodying the invention.
Figure 2:
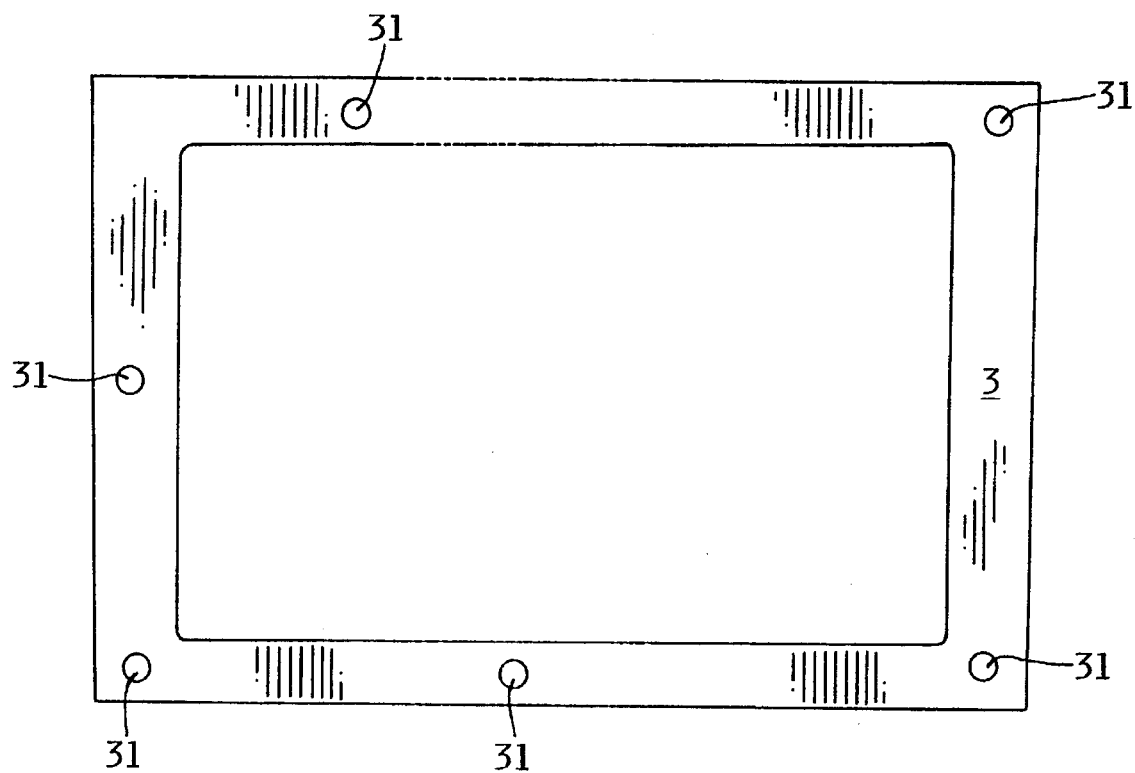
FIG. 2 is a top view of a permeable gasket in accordance with a preferred embodiment of the present invention.
Figure 3:
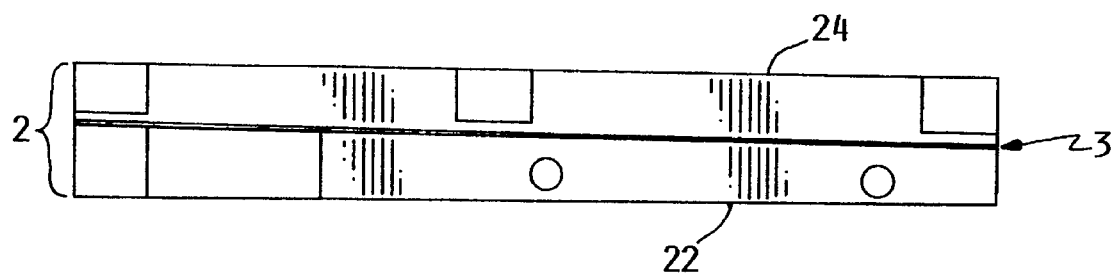
FIG. 3 is a side view of an enclosure for a data storage device with housing cover attached and including a gasket embodying the invention.

As illustrated in the drawings, a data storage system is shown including a disk drive mechanism, an enclosure 2 formed of a housing base 22 and housing cover 24, a mounting system for holding the drive mechanism in the enclosure (shown in FIG. 1 as a dead shaft 20 and mounting screws 32), and a porous or permeable gasket 3 having scavenging capabilities for sealing the enclosure 2 and removing pollutants from ambient atmosphere that passes through the gasket 3 and into the enclosure 2.

Referring to FIG. 1, the drive mechanism typically includes rotating media 4, read/write heads 5, and actuator 6 for positioning the heads 5 to access the rotating media 4. The rotating media 4 typically includes one or more rigid data storage disks 4 which rotate about a common motor spindle 7 at a relatively high rate of rotation. If more than one disk is employed, the disks are stacked coaxially in a tandem spaced relationship. Each disk is preferably formatted to include a plurality of spaced concentric tracks 8, with each track being partitioned into a series of data and servo sectors 9 which, in turn, are further divided into various informational fields. A motor spindle 7 typically comprises a three-phase a.c. motor energized by a stepping power supply 11 for rotating the data storage disks 4.

The actuator 6 typically includes a plurality of interleaved actuator arms 12, with each arm 12 having one or more transducers or read/write heads 5 mounted to a load beam 13 for reading and writing information onto the data storage disks 4. The actuator 6 is usually mounted to a stationary actuator shaft 14, and rotates thereon to move the actuator arms 12 into and out of the stack of data storage disks 4. A coil assembly 15, mounted to a coil frame 16 of the actuator 6, generally rotates within a gap defined between the upper and lower magnet assemblies 17 and 18 of a permanent magnet structure 19, causing the actuator arms 12, in turn, to sweep over the surfaces of the data storage disks 4.

The coil assembly 15 and the upper and lower magnet assemblies 17 and 18 of the permanent magnet structure 19 operate in cooperation as a voice coil motor responsive to control signals produced by a controller 21. The voice coil motor produces a torquing force on the actuator coil frame 16 of the actuator 6 when control currents of varying direction and magnitude flow in the coil assembly 15 in the presence of a magnetic field produced by the permanent magnet structure 19. The torquing forces imparted on the actuator coil frame 16 of the actuator 6, in turn, cause corresponding rotational movement of the actuator arms 12 in directions dependent on the polarity of the control currents flowing in the coil assembly 15. A controller 21 preferably includes control circuity that coordinates the transfer of data to and from the data storage disks 4, and cooperates with the voice coil motor to move the actuator arms 12 and read/write heads 5 to prescribed track 8 and sector 9 locations when reading and writing data to the disks 4.

The drive mechanism is typically mounted with a mounting system for holding the drive mechanism in place within the enclosure 2. The enclosure 2 is typically formed of a plurality of stiff pieces formed with mating surfaces that conform to one another when assembled. The stiff pieces are typically designed to closely conform to the drive mechanism for minimum overall volume. In the embodiment shown in FIG. 1, the enclosure 2 is formed by a housing base 22 and a housing cover 24. The mounting system includes a plurality of screws 32 which secure the actuator 6 to the housing base 22, and a dead shaft 20 which secures the motor spindle 7 to the housing base 22. Although a plurality of screws 32 and a dead shaft 20 are shown as the mounting system, it will be appreciated that any suitable mounting means may be used to secure the drive mechanism to the enclosure 2.

To seal the enclosure 2, fasteners or screws 25 are provided which attach the housing cover 24 to the housing base 22. As can be seen with reference to FIG. 1 the housing base 22 has a mating surface 26 having a plurality of screwholes 27 therein. By way of example, the embodiment shown in the figures uses six screws 25 as the fasteners for holding the housing cover 24 on the housing base 22. The housing cover 24 has a matching mating surface 28 that mirrors mating surface 26 of the housing base 22. The housing cover 24 also has a plurality of screwholes 29 that are aligned with the screwholes 29 in the mating surface 26 of the housing base 22.

The housing base 22 and cover 24 may be fabricated from cast aluminum, plastic or other suitably rigid material. Although this embodiment shows a housing base 22 that is primarily flat and a housing cover 24 that fits over the drive mechanism, the invention is equally applicable to other enclosure configurations such as a bathtub design where the drive mechanism fits down and is attached in a recessed base housing, and a flat housing cover fits over the top of the recessed base housing.

A gasket 3 having ionic scavenging capabilities is disposed between the housing base 22 and housing cover 24 to provide a tight seal within the enclosure 2. The gasket 3 takes the same shape as the mating surfaces 26 and 28, and includes a plurality of screwholes 31 that are aligned with the screwholes 27 and 29 in the housing base 22, and housing cover 24, respectively. When the enclosure 2 is assembled, the gasket 3 is placed between the mating surface 26 of the housing base 22 and the mating surface 28 of the housing cover 24. A fastener 25 compresses the gasket 3 into contact with the mating surfaces 26 and 28 under sufficient force to allow a very small amount of ambient atmosphere to flow through the gasket 3 and into the enclosure 2.

An important aspect of the invention pertains to the construction of the gasket 3. The invention provides a gasket 3 made of a flexible compressible porous or permeable material impregnated with a compound capable of scavenging pollutants from atmosphere that passes through the gasket 3. Scavenging salts are often used to trap corrosive pollutants. Examples of chemicals which provide some degree of ionic scavenging include the carbonates, bicarbonates, acetates and borates with couterions of sodium, magnesium, calcium and potassium.

By way of example, the gasket 3 may be formed of polyurethane foam sold under the trademark "PORON" by Rogers Corporation, East Woodstock, Connecticut, and having the properties desired for a gasket or seal. Polyurethane foams are spongy cellular materials produced by a reaction of a polyester (such as glycerin) with a diisocyanate (such as toluene diisocyanate) while carbon dioxide is liberated by the reaction of carboxyl with the isocyanate. The material should provide the desired flexibility and compressibility so as to conform to the mating surfaces 26 and 28 of the housing base 22 and housing cover 24, and provide a tight seal when compressed between the mating surfaces. As a porous foam, the gasket 3 will soak up solution like a sponge. By soaking or spraying the gasket with a scavenging solution, one can coat the surface and inner cell structure of the gasket with a crystalline salt film that has the capacity to scavenge ionic pollutants from the environment.

An advantage of imparting scavenging properties to a disk drive gasket is that small form factor drives that would not otherwise contain a filter due to size constraints will still have a corrosion protection scheme via the gasket. Another important advantage of the present gasket invention pertains to the spacing between the read/write heads and the disk surface. To combat corrosion in some current disk drives, the read/write heads are coated with a protective carbon film. However, this film increases the spacing between the heads and the disk surface and, therefore, for magnetic heads and data storage disks, decreases the strength of the signal sensed by the heads. By removing the carbon coating and incorporating a corrosion protection scheme into the gasket, the magnetic spacing between the read/write heads and disk surfaces can be reduced. Thus, design engineers will be free to concentrate on optimizing performance, rather than compromising performance for corrosion reliability.

To make the improved gasket 3 of this invention, the porous foam material is typically cut to conform to the desired shape as described above and shown in the drawings, and a solution of the desired scavenging compound is infiltrated into the material. By way of example, a solution of sodium carbonate prepared from one part carbonate and 100 parts water may be used. Higher concentrations of carbonate in the solution will generally result in a higher weight percent in the porous foam. The cut piece of porous foam may then be submersed in a vat of a desired ionic scavenging compound solution for a period of several minutes, so that all parts of the porous foam are covered and wet. Alternatively, the scavenging compound solution may be applied to the porous foam by spraying, or other application techniques. After removal from the vat or other preparation area, excess liquid typically is permitted to drain from the treated piece of porous foam. An additional drying step may be desired wherein the treated porous foam gasket is placed in a drying oven for a period of time necessary to evaporate water contained in the ionic scavenging compound solution.

Scavenging gasket 3 preferably is designed so as to not generate particles that would compromise the cleanliness of the enclosure 2. One way to control the problem of possible particulate shedding by gasket 3 is to spray the treated porous foam gasket with a UV sealant material under controlled spraying conditions. The coated gasket may then be cured in a UV oven. The sealant has the effect of shutting down some of the diffusive transport paths making the gasket a better seal, but the remaining pathways will still have the desired scavenging capacity to remove corrosive pollutants from ambient atmosphere that passes through the gasket into the enclosure.

Although only a few embodiments of the present invention have been described herein, it should be understood that the present invention may be embodied in many other specific forms without departing from the spirit and scope of the invention. Particularly, it should be appreciated that the actual materials used to form the porous foam gasket may be widely varied. Additionally, the solution with which the gasket is prepared may also vary so long as it imparts the desired scavenging properties., Furthermore, the gasket may be used with any data storage configuration, or even for other applications outside the data storage field. Therefore, the present examples and embodiments are to be considered as illustrative and not restrictive, and the invention is not to be limited to the details given herein, but may be modified within the scope of the appended claims.

What is claimed is:

1. A gasket for sealing two relatively stiff mating pieces of an enclosure, said gasket comprising:

a flexible compressible gasket member shaped to fit between said mating pieces, said gasket member having sealing and filtering properties, said gasket member consisting of a porous material and is configured so as to pass only a small amount of ambient atmosphere therethrough and to collect a portion of particulate pollutants in atmosphere passing therethrough, and a corrosive pollutant scavenging compound infiltrated into said porous material for removing pollutants from the ambient atmosphere passing through said porous material.

2. The gasket of claim 1, wherein said scavenging compound is selected from the group consisting essentially of salts of bicarbonate, carbonate, acetate, borate, or mixture thereof.

3. The gasket of claim 1, wherein said porous material comprises polyurethane foam.

4. The gasket of claim 2, wherein said porous material comprises polyurethane foam.

5. An enclosure for an instrumentality sensitive to pollutants in an ambient atmosphere, comprising:

a plurality of relatively stiff pieces having mating surfaces;

a gasket shaped to fit between said mating surfaces comprising a gasket member having sealing and filtering properties, said gasket member consisting of a porous material and is configured so as to pass only a small amount of ambient atmosphere therethrough and to collect a portion of particulates in atmosphere passing therethrough, and a corrosive pollutant scavenging compound infiltrated into said porous material for removing pollutants from the ambient atmosphere passing through said porous material; and a fastener for compressing said gasket into contact with said mating surfaces under sufficient force to allow a very small amount of said atmosphere to flow through said gasket.

6. The enclosure of claim 5, wherein said scavenging compound is selected from the group consisting essentially of salts of bicarbonate, carbonate, acetate, borate, or mixture thereof.

7. The enclosure of claim 5, wherein said gasket comprises polyurethane foam.

8. The enclosure of claim 6, wherein said gasket comprises polyurethane foam.

9. A disk drive comprising:

a drive mechanism including rotating media, read/write heads, and an actuator for positioning said heads for accessing said media;

an enclosure housing said drive mechanism and having a plurality of thin, relatively stiff pieces closely conforming to said drive mechanism, said pieces having mating surfaces;

a gasket shaped to fit between said mating surfaces comprising a gasket member having sealing and filtering properties, said gasket member consisting of a porous material and is configured so as to pass only a small amount of ambient atmosphere therethrough and to collect a portion of particulate pollutants in atmosphere passing therethrough, and a corrosive pollutant scavenging compound infiltrated into said porous material for removing pollutants from the atmosphere passing through said porous material; and a fastener for compressing said gasket into contact with said mating surfaces under sufficient force to allow a very small amount of the atmosphere to flow through said gasket.

10. The disk drive of claim 9, wherein said scavenging compound is selected from the group consisting essentially of salts of bicarbonate, carbonate, acetate, borate, or mixture thereof.

11. The disk drive of claim 9, wherein said gasket comprises polyurethane foam.

12. The disk drive of claim 10, wherein said gasket comprises polyurethane foam.

\* \* \* \* \*